United States Patent [19]

Kuwahara

[11] Patent Number: 4,890,110
[45] Date of Patent: Dec. 26, 1989

[54] MICROWAVE LANDING SYSTEM
[75] Inventor: Yoshihiko Kuwahara, Tokyo, Japan
[73] Assignee: NEC Corporation, Tokyo, Japan
[21] Appl. No.: 292,270
[22] Filed: Dec. 30, 1988
[30] Foreign Application Priority Data
  Jan. 12, 1988 [JP] Japan .................................. 63-5251
[51] Int. Cl.⁴ .............................................. G01S 13/00
[52] U.S. Cl. ...................................... 342/35; 342/408; 342/374
[58] Field of Search .......................... 342/408, 374, 35
[56] References Cited
  U.S. PATENT DOCUMENTS
  4,837,580 6/1989 Frazita ................................ 342/374

Primary Examiner—Theodore M. Blum
Attorney, Agent, or Firm—Foley & Lardner, Schwartz, Jeffery, Schwaab, Mack, Blumenthal & Evans

[57] ABSTRACT

A microwave landing system in which a beam scanning antenna is provided with an amplifying function to constitute an active array, a traditional power amplifier and the like are omitted to enhance the reliability of operation. The outputs of phase shifters each being associated with a respective one of radiating elements are connected to ½ dividers each having p-i-n diodes at opposite output terminals thereof, and the p-i-n diodes of each ½ divider are turned on and off alternately. Output signals are fed to radiating elements and a multiplexer with a minimum of loss.

3 Claims, 6 Drawing Sheets

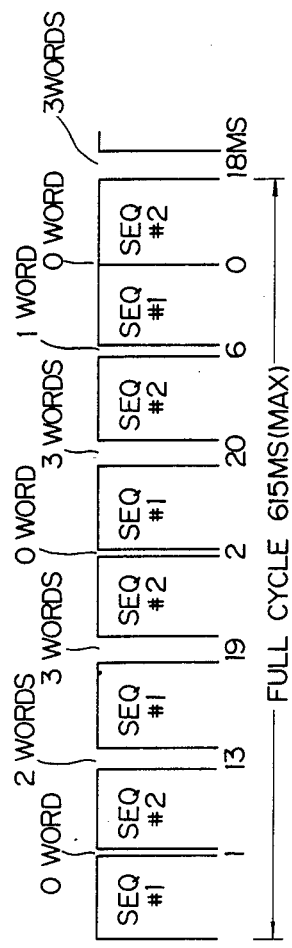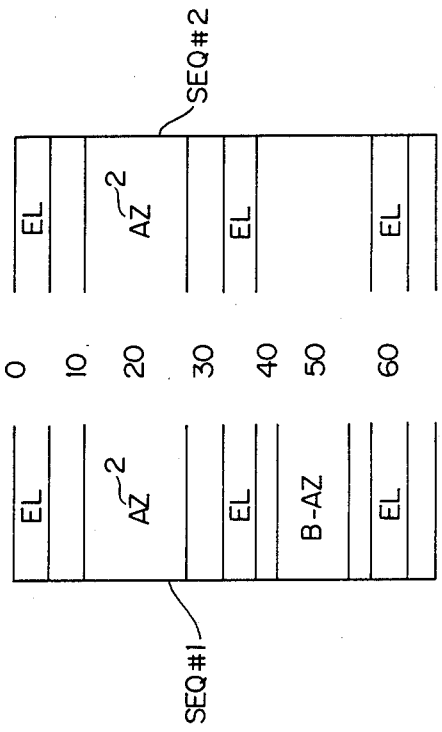
Fig.2A
Fig.2B

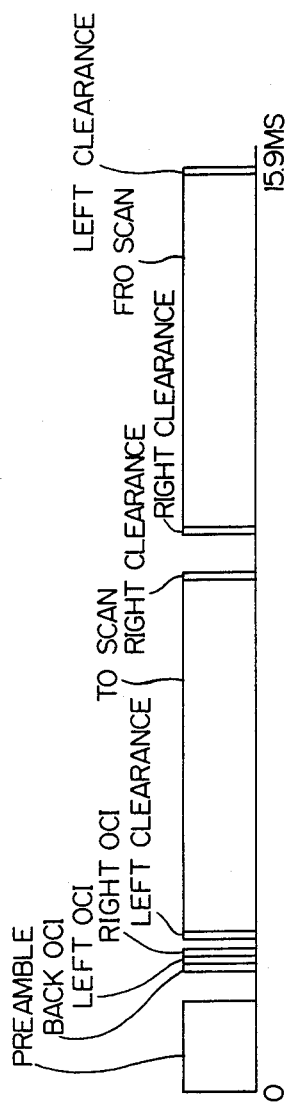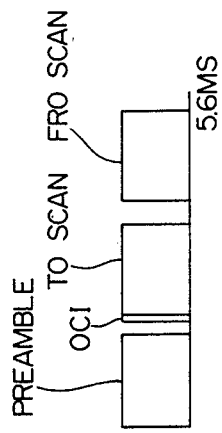

MICROWAVE LANDING SYSTEM

BACKGROUND OF THE INVENTION

The present invention relates to a microwave landing system (MLS) and, more particularly, to an MLS in which a beam scanning antenna is provided with an amplifying function to serve as an active array and a traditional amplifier is omitted to enhance reliable operations.

An MLS has customarily been constituted by an elevation (EL) guidance equipment and an azimuth (AZ) guidance equipment with or without the addition of a back EL (BAZ) guidance equipment. The EL guidance equipment and AZ guidance equipment are essentially similar in construction to each other except for the arrangement of a beam scanning antenna. Specifically, while the beam scanning antenna of the AZ guidance equipment forms a vertically wide and horizontally narrow fan beam and moves it in a reciprocating motion in the azimuthal direction, the beam scanning antenna of the EL guidance equipment forms a horizontally wide and vertically narrow fan beam and reciprocatingly moves it in the elevational direction. The AZ guidance equipment and the EL guidance equipment are equipped with six auxiliary antennas and two auxiliary antennas, respectively. Both of the AZ guidance equipment and EL guidance equipment are made up of a controller for generating a system sync signal which governs the timings of the entire system and a timing signal which determines the operation timings of the guide itself, an exciter for generating a signal having a predetermined frequency to be used by the MLS and modulating a preamble of transmission timings by DPSK (Differential Phase Shift Keying) according to a predetermined sequence, a power amplifier for amplifying a high frequency signal generated by the exciter to a predetermined output, and an antenna switching unit for selectively feeding power to antennas. Each beam scanning antenna is generally implemented by a phased array. Specifically, each beam scanning antenna is made up of a power divider for dividing transmission power by a predetermined ratio, phase shifters for effecting phase shifts for beam scanning, and radiating elements.

The prior art MLS having a beam scanning antenna which is implemented as a phased array is provided with redundancy. However, a power amplifier, antenna switching unit and the like which are included in each of the AZ and EL guidance equipments and are the key to the reliability of operation are not provided with redundancy. Especially, when the system is constructed in a dual configuration, it is extremely difficult to provide the antenna switching unit with redundancy and therefore to enhance the reliability of operation.

SUMMARY OF THE INVENTION

It is therefore an object of the present invention to provide an MLS operable with high reliability and continuously over a long period of time.

It is another object of the present invention to provide an MLS capable of feeding power to antennas with a minimum of loss.

It is another object of the present invention to provide a generally improved MLS.

A microwave landing system for feeding predetermined power to an auxiliary antennas of the present invention comprises a power divider for dividing power in a distribution ratio which is associated with n radiating elements of a beam scanning antenna, n phase shifters individually associated with the n radiating elements for providing fractions of the divided power with phases for effecting beam scanning, n variable attenuators individually associated the n phase shifters for providing outputs of the phase shifters with attenuations of predetermined characteristics which are variable depending upon whether or not a beam scanning timing is reached, n power amplifiers individually associated with the n variable attenuators for amplifying outputs of the variable attenuators to a predetermined level, n ½ dividers individually associated with the n power amplifiers for dividing outputs of the power amplifiers into two and each feeding one of resulting two outputs to the radiating element associated with the ½ divider, the ½ dividers each comprising two p-i-n diodes individually connected between opposite output terminals and ground and turning off the p-i-n diodes connected to the radiating element and turning on the other p-i-n diode at a beam scanning timing, and a power combiner for combining the other output of the n ½ dividers being not connected to the radiating elements and delivering a resulting combined signal to an auxiliary antenna located outside of the n radiating elements.

BRIEF DESCRIPTION OF THE DRAWINGS

The above and other objects, features and advantages of the present invention will become more apparent from the following detailed description taken with the accompanying drawings in which:

FIG. 2A shows transmission timings;

FIG. 2B shows the format of sequences #1 and #2 shown in FIG. 2A;

FIG. 3A shows AZ transmission timings shown in FIG. 2B;

FIG. 3B shows EL transmission timings also shown in FIG. 2B;

DESCRIPTION OF THE PREFERRED EMBODIMENT

To better understand the present invention, a brief reference will be made to a prior art MLS.

Figure 1:
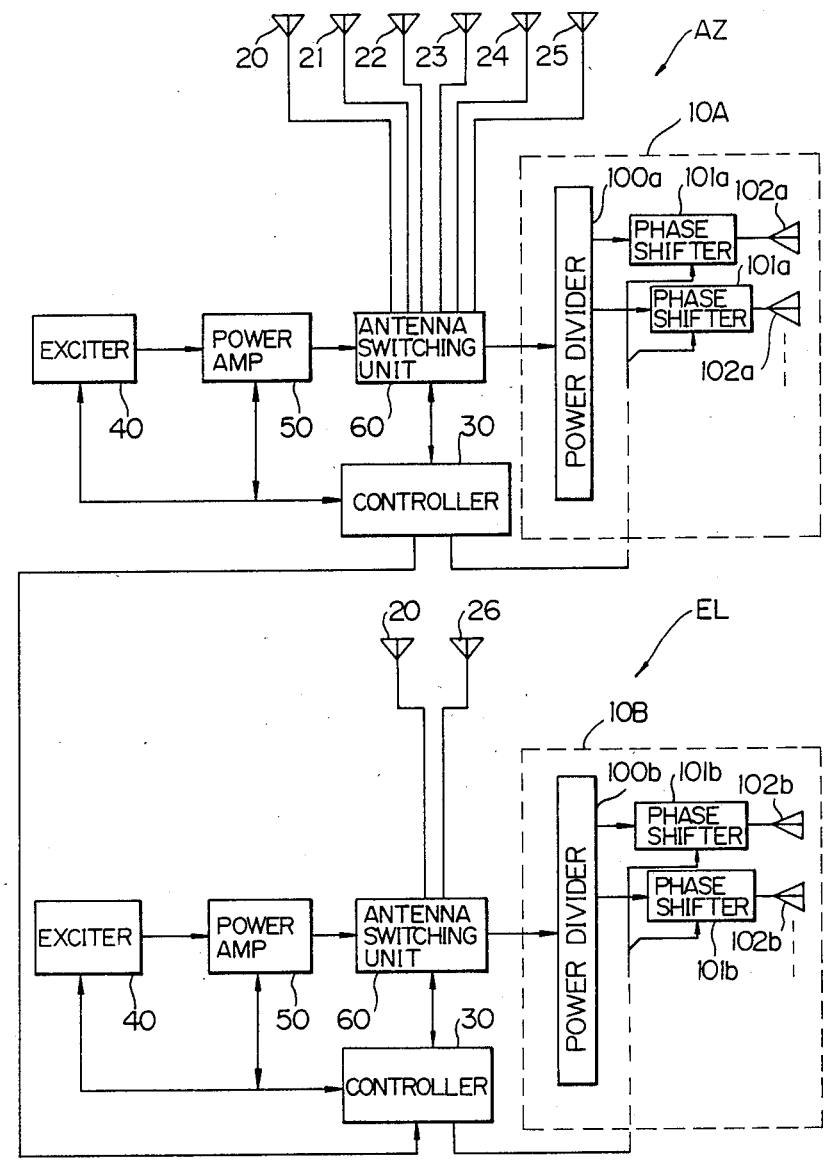
FIG. 1 is a schematic block diagram showing a prior art MLS.

As shown in FIG. 1, a prior art MLS is implemented by an AZ guidance equipment and an EL guidance equipment with or without the addition of a back AZ (BAZ) guidance equipment. The AZ guidance equipment and EL guidance equipment are essentially similar in construction to each other except for the arrangement of an antenna. The AZ guidance equipment and the EL guidance equipment are equipped with beam scanning antennas 10A and 10B, respectively. Specifically, while the beam scanning antenna 10A of the AZ guidance equipment forms a vertically wide and horizontally narrow fan beam and moves it in a reciprocating motion in the azimuthal direction, the beam scanning antenna 10B of the EL guidance equipment forms a horizontally wide and vertically narrow fan beam and reciprocatingly moves it in the elevational direction. The AZ guidance equipment is further provided with a data antenna 20, a left OCI (Out of Coverage Indication) antenna 21, a right OCI antenna 22, a rear OCI antenna 23, a right clearance antenna 24, and a left clearance antenna 25. On the other hand, the EL guidance equipment is provided with a data antenna 20 and an OCI antenna 26. A current trend in the art is toward the omission of OCI antennas, and even clearance signals associated with the clearance antennas may be transmitted via beam scanning antennas. Presumably, therefore, each of the AZ and EL guidance equipments will be equipped with a single auxiliary antenna, i.e., data antenna in the future. The prior art MLS will be outlined taking the AZ guidance equipment for example.

The entire MLS uses the same frequency and, as shown in FIGS. 2A and 2B, sends predetermined signals via the independent antennas on a time division basis. Specifically, FIG. 2A shows the transmission timings of the MLS while FIG. 2B shows the formats of sequences (SEQs) #1 and #2 shown in FIG. 2A. As shown, the transmission timings of the MLS are defined by four blocks of SEQ #1 and four blocks of SEQ #2. At a normal rate, each of the blocks involves a single AZ timing and three EL timings. FIGS. 3A and 3B illustrate respectively the AZ transmission timing and the EL transmission timing which are shown in FIG. 2B. As shown in FIG. 3A, the AZ timing is made up of the timings of a preamble sent over the data antenna, OCI signals individually sent over the right, left and rear OCI antennas, clearance signals individually sent over the right and left clearance antennas or the beam scanning antenna 10A, and a beam scanning signal sent over the beam scanning antenna 10A.

Referring again to FIG. 1, the AZ guidance equipment includes a controller 30 for generating a system sync signal which governs the timings of the entire system and a timing signal which determines the operation timings of the AZ guidance equipment. An exciter 40 generates a signal of 5 gigahertz to be used by the MLS and modulates a preamble by DPSK in a predetermined sequence. A power amplifier 50 amplifies a high frequency signal generated by the exciter 40 to a predetermined level. An antenna switching unit 60 selectively applies power to the antennas according to a sequence which is determined by the controller 30. Usually implemented by a phased array, the beam scanning antenna 10A is comprised of a power divider 100a for dividing the transmission power by a predetermined division ratio, phase shifters 101a for effecting phase shifts for beam scanning, and radiating elements 102a. Generally, the auxiliary antennas 20 to 25 are each constructed into a waveguide slot array having a reflector. Likewise, the beam scanning antenna 10B of the EL guidance equipment is made up of a power divider 100b, phase shifters 101b, and radiating elements 102b. The EL guidance equipment is operated in substantially the same manner as the AZ guidance equipment except for the directivity characteristics defined by the radiating elements 102b.

The prior art MLS having a beam scanning antenna which is implemented as a phased array is provided with redundancy. However, a power amplifier, antenna switching unit and the like which are included in each of the AZ and EL guidance equipments and are the key to the reliability of operation are not provided with redundancy. Especially, when the system is constructed in a dual configuration, it is extremely difficult to provide the antenna switching unit with redundancy and therefore to enhance the reliability of operation.

Figure 4:
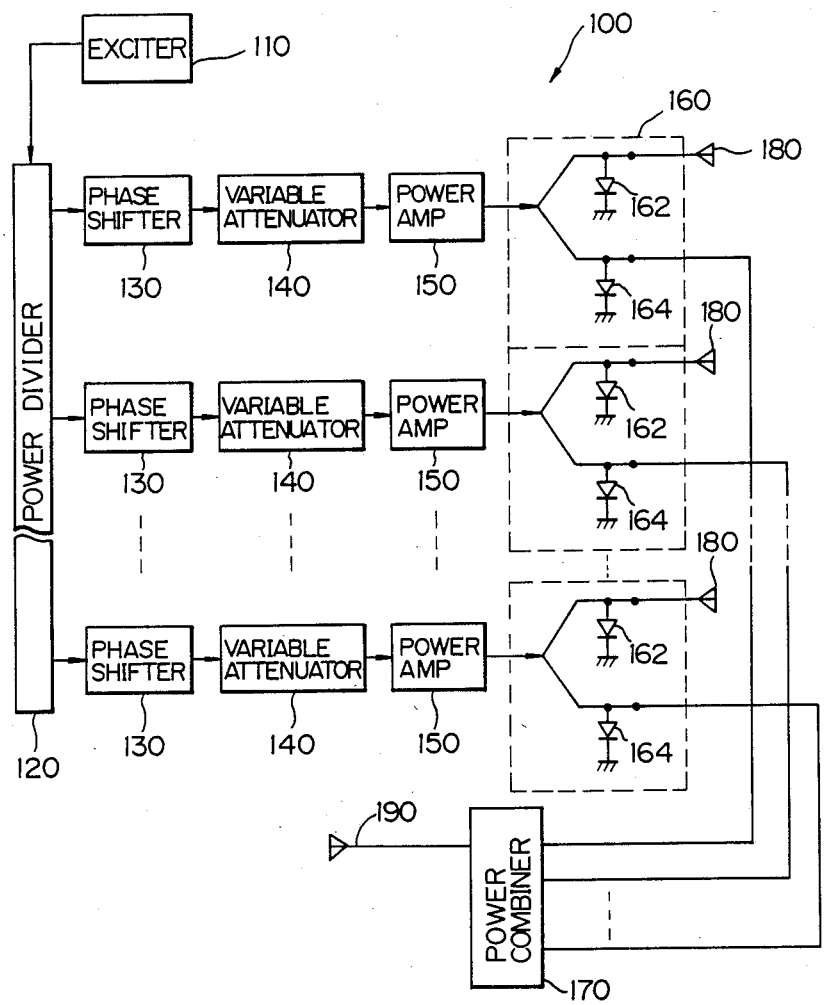
FIG. 4 is a schematic block diagram showing an MLS emboding the present invention.

Referring to FIG. 4, an MLS embodying the present invention is shown and generally designated by the reference numeral 100. The system is not provided with OCI antennas because OCI antennas will be disused in the future, as discussed earlier. In the figure, there are shown an exciter 110, a power divider 120, n phase shifters 130, n variable attenuators 140, n power amplifiers 150, n ½ dividers 160 each having PIN diodes 162 and 164, n radiating elements 180, and a data antenna 190.

Figure 5:
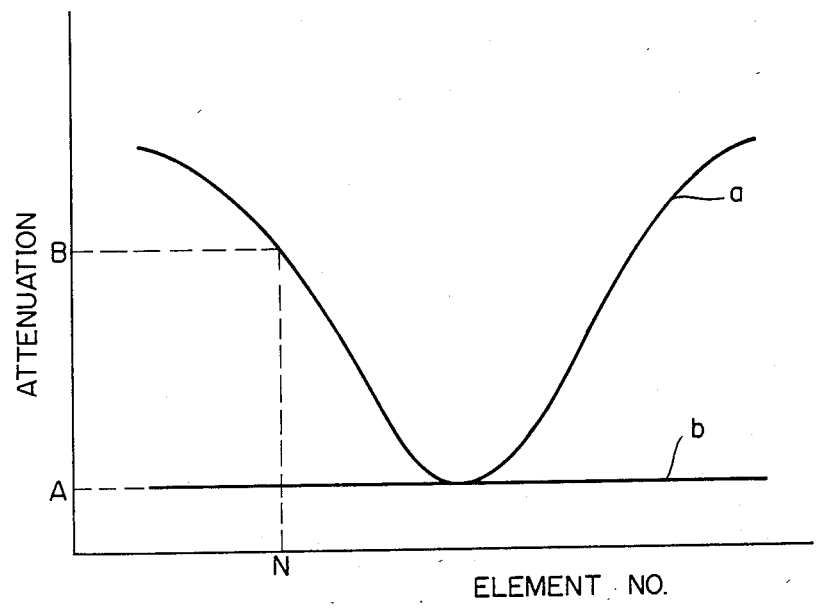
FIG. 5 is a plot useful for understanding the opeation of variable attenuators included in the embodiment of FIG. 4.
Figure 6:
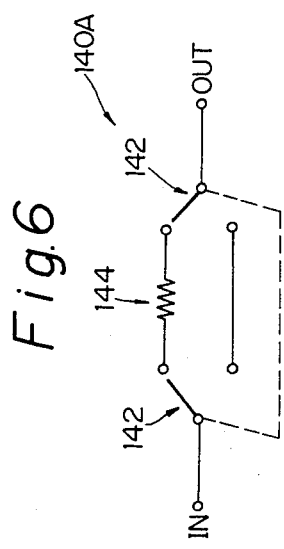
FIG. 6 is a diagram schematically showing a specific construction of the variable attenuators.
Figure 7:
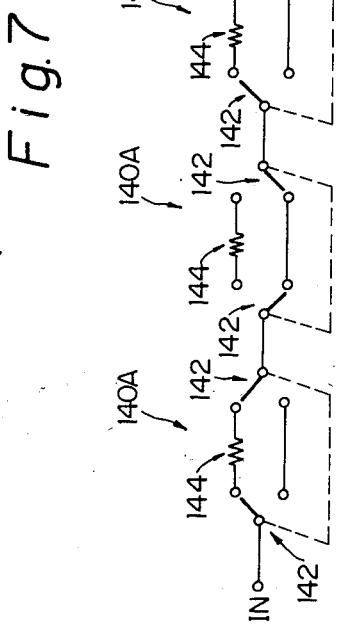
FIG. 7 is a diagram schematically showing another specific construction of the variable attenuators.

The exciter 110 produces an MLS signal which has been modulated by DPSK in a predetermined format and delivers it to the power divider 120. In response, the power divider 120 equally divides the MLS signal and feeds the resulting fractions to the n phase shifters 130. Outputs of the phase shifters 130 are individually applied to the variable attenuators 140 which sets up a Taylor distribution or the like at a beam scanning timing and a uniform amount of attenuation at the other timings. More specifically, the variable attenuators 140 provide attenuations which are distributed as represented by a curve a in FIG. 5 at a TO scan timing and an FRO scan timing of FIGS. 3A and 3B, thereby setting up a Taylor distribution of the like. At the other timings, the variable attenuators 140 provide a uniform and minimum amount of attenuation as represented by a line b in FIG. 5. Concerning the "n" radiating element, the variable attenuator 140 connected to this particular radiating element effects attenuation by any of the amounts A and B shown in FIG. 5. The attenuation B differs from one radiating element to another. As shown in FIG. 6, the simplest form of the variable attenuator 140 is the combination of fixed attenuators 144 and a p-i-n diode switch 142. In this case, however, the fixed attenuators 144 connected to any particular radiating element 180 have to be so selected as to effect an attenuation which is different from attenuations of the others. FIG. 7 shows an alternative variable attenuator 140B having multiple variable attenuators 140A of FIG. 6 which are cascaded in consecutive steps and having a capability for digitally changing the amount of attenuation as needed. With the configuration shown in FIG. 7, it is possible to implement all of the variable attenuators associated with the beam scanning antenna of the illustrative embodiment with a single variable attenuator. The variable attenuator 140B shown in FIG. 7 is capable of varying the amount of attenuation over a range of 0 dB to 15 dB by 1 dB step.

The signals each being attenuated by a respective one of the variable attenuators 140 are fed to their associated power amplifiers 150 to be thereby amplified to desired power. The outputs of the amplifiers 150 which are set up based on the MLS technical standards are less than 2 W, even taking account of the loss of a power combiner 170 which will be described. The power amplifiers 150 remain inoperative except for the radiating timings of the device (i.e. TO scan timing, FRO scan timing, clearance timing and preamble timing shown in FIGS. 3A and 3B; OCI antennas being omitted in the illustrative embodiment). The outputs of the power amplifiers 150 are fed to their associated ½ dividers 160 each having the p-i-n diodes 162 and 164 at opposite output terminals thereof. At the beam scanning timings, i.e., TO scan, FRO scan and clearance timings shown in FIGS. 3A and 3B, the p-i-n diodes 164 are turned on while the p-i-n diodes 162 are turned off. When the characteristic impedances and electrical lengths of the branches of each ½ divider 160 are adequately selected, power routed to the p-i-n diode 164 will be totally reflected by the p-i-n diode 164 toward the radiating elements 180. Conversely, at the timing for feeding power to the data antenna, the p-i-n diodes 162 are turned on and the p-i-n diodes 164 are turned off. At this instant, the outputs of the power amplifiers 150 are applied to the power combiner 170 with a minimum of loss. When signals are to be applied to the power combiner 170, the amounts of attenuation effected by the variable attenuators 140 become equal and, yet, the phase shifters 130 control the inputs thereto to uniformize them with respect to phase. The power combiner 170 may be implemented by an ordinary combiner having multiple inputs and one output.

In summary, it will be seen that the present invention provides an MLS capable of feeding output signals to radiating elements and a power combiner with a minimum of loss. This unprecedented advantage is achieved by constructing a beam scanning antenna into an active array, connecting the outputs of phase shifters each being associated with a respective one of radiating elements to ½ dividers each having p-i-n diodes at opposite output terminals, and turning on and off the p-i-n diodes of each ½ divider alternately.

Further, in accordance with the present invention, a signal source and a control section are each constructed in a dual configuration to offer redundancy to all of the sections. The system is therefore capable of operating with significant reliability and continuously over a long period of time.

Various modifications will become possible for those skilled in the art after receiving the teachings of the present disclosure without departing from the scope thereof.

What is claimed is:

1. A microwave landing system for feeding predetermined power to an auxiliary antenna, comprising:

a power divider for dividing power in a distribution ratio which is associated with n radiating elements of a beam scanning antenna;

n phase shifters individually associated with said n radiating elements for providing fractions of the divided power with phases for effecting beam scanning;

n variable attenuators individually associated said n phase shifters for providing outputs of said phase shifters with attenuations of predetermined characteristics which are variable depending upon whether or not a beam scanning timing is reached;

n power amplifiers individually associated with said n variable attenuators for amplifying outputs of said variable attenuators to a predetermined level;

n ½ dividers individually associated with said n power amplifiers for dividing outputs of said power amplifiers into two and each feeding one of resulting two outputs to said radiating element associated with said ½ divider, said ½ dividers each comprising two p-i-n diodes individually connected between opposite output terminals and ground and turning off said p-i-n diodes connected to said radiating element and turning on the other p-i-n diode at a beam scanning timing; and a power combiner for combining said other output of said n ½ dividers being not connected to said radiating elements in a predetermined format and delivering a resulting combined signal to an auxiliary antenna located outside of said n radiating elements.

2. A microwave landing system as claimed in claim 1, wherein said variable attenuators each comprises a p-i-n diode switch and fixed attenuators individually connected to an input side and an output side of said p-i-n diode switch.

3. A microwave landing system as claimed in claim 2, wherein a multiplicity of said variable attenuators each comprising said p-i-n diode switch and said fixed attenuators are cascaded.

* * * * *